United States Patent
Criniere et al.

(10) Patent No.: US 8,293,829 B2
(45) Date of Patent: Oct. 23, 2012

(54) COLLOIDAL DISPERSIONS OF INORGANIC PARTICLES IN LIQUID PHASES COMPRISING AMPHOLYTIC COPOLYMERS

(75) Inventors: Guillaume Criniere, Ixelles (BE); Claire Pitois, Sunbyberg (SE); Mathias Destarac, Toulouse (FR)

(73) Assignee: Rhodia Operations, Aubervilliers (FR)

( * ) Notice: Subject to any disclaimer, the term of this patent is extended or adjusted under 35 U.S.C. 154(b) by 79 days.

(21) Appl. No.: 12/742,095

(22) PCT Filed: Oct. 29, 2008

(86) PCT No.: PCT/EP2008/064674
§ 371 (c)(1),
(2), (4) Date: Sep. 27, 2010

(87) PCT Pub. No.: WO2009/059919
PCT Pub. Date: May 14, 2009

(65) Prior Publication Data
US 2011/0009552 A1    Jan. 13, 2011

(30) Foreign Application Priority Data
Nov. 9, 2007 (FR) .................................. 07 07872

(51) Int. Cl.
*C08K 3/00* (2006.01)
*C08L 33/06* (2006.01)
(52) U.S. Cl. ........................................ 524/403; 524/560

(58) Field of Classification Search .................. 524/403
See application file for complete search history.

(56) References Cited

U.S. PATENT DOCUMENTS

| 5,076,846 | A | 12/1991 | Buri et al. |
| 6,811,758 | B1 * | 11/2004 | Pickering et al. ............ 423/21.1 |
| 2009/0197791 | A1 * | 8/2009 | Balastre et al. ............... 510/407 |

FOREIGN PATENT DOCUMENTS

| FR | 2894585 A1 | 6/2007 |
| FR | 2894585 A1 * | 6/2007 |
| JP | 3-64373 A | 3/1991 |

OTHER PUBLICATIONS

Official Action issued by the Japanese Patent Office on Nov. 22, 2011 in corresponding Japanese Patent Application No. 2010-532547, and a partial English language translation of the Official Action.

* cited by examiner

*Primary Examiner* — Hui Chin
(74) *Attorney, Agent, or Firm* — SNR Denton US LLP

(57) ABSTRACT

Colloidal dispersions of inorganic particles in a liquid phase include ampholytic copolymers containing at least one macromolecular chain B and a moiety A bonded to a single end thereof and in which the macromolecular chain B includes cationic units Bc, deriving from cationic monomers Bc and the moiety A is a polymeric or non-polymeric group containing at least one anionic or potentially anionic group; such dispersions may have a positive zeta potential within a pH ranging from 1 to 11.

20 Claims, 1 Drawing Sheet

Figure 1:
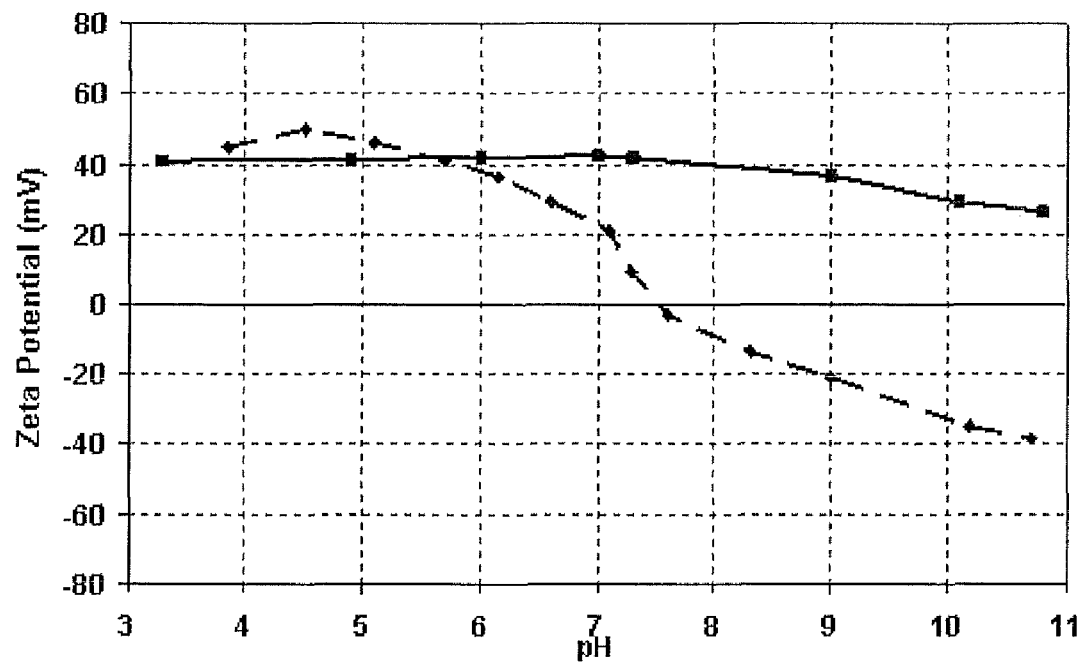

COLLOIDAL DISPERSIONS OF INORGANIC PARTICLES IN LIQUID PHASES COMPRISING AMPHOLYTIC COPOLYMERS

CROSS-REFERENCE TO PRIORITY/PCT APPLICATIONS

This application is a national phase of PCT/EP2008/064674, filed Oct. 29, 2008 and designating the United States (published in the French language on May 14, 2009, as WO 2009/059919 A1; the title and abstract were also published in English), which claims priority under 35 U.S.C. §119 of FR 0707872, filed Nov. 9, 2007, each hereby expressly incorporated by reference in its entirety and each assigned to the assignee hereof.

The present invention relates to a colloidal dispersion of inorganic particles in a liquid phase which comprises an ampholytic copolymer.

Colloidal dispersions (or sols) of metal oxides and/or hydrated oxides (hydroxides) are well known to a person skilled in the art and their methods of preparation have been widely described in the prior art. Cerium sols are well known, as are zirconium oxide or titanium oxide sols. As regards zirconium oxide sols, for example, reference may in particular be made to the Journal of Gel Science Technology, Vol. 1, p. 223 (1994). Mention may also be made of the paper in Chemical Materials, Vol. 10, pp. 3217-3223 (1998), as regards titanium oxide sols.

Depending on the nature of the metal element employed, these dispersions can be highly advantageous for applications in the field of catalysis, where they are used as a source of nanometric particles in the preparation of supported catalysts, or in the field of protection from UV radiation. These dispersions are also advantageous in the field of the electronics industry, where they can be used for the polishing of various components, such as discs or dielectric compounds.

One of the major problems related to these dispersions is their stability, very particularly their stability as a function of pH. The dispersions have to be stable; this is understood to mean that the colloidal particles of which they are composed have to remain in suspension in the liquid phase without separation by settling occurring over a sufficient period of time for optimum use. In addition, dispersions are desired which are stable over a significant pH range which makes it possible to effectively use them in applications and under conditions which are as varied as possible.

The object of the invention is to provide such dispersions.

With this aim, the colloidal dispersion of inorganic particles in a liquid phase according to the invention is characterized in that it comprises an ampholytic copolymer comprising at least one macromolecular chain B and a part A bonded to a single end of at least one macromolecular chain B, in which:

the macromolecular chain B comprises cationic units $B_C$ deriving from cationic monomers $B_C$, the part A is a polymeric or nonpolymeric group comprising at least one anionic or potentially anionic group.

Figure 2:
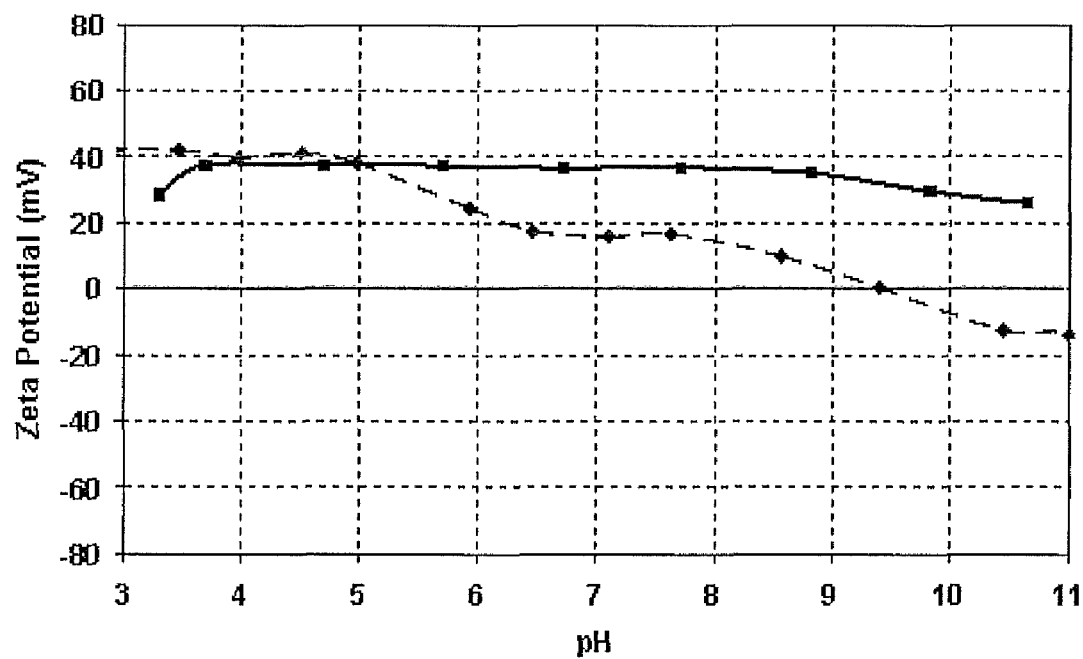

Other characteristics, details and advantages of the invention will become even more fully apparent on reading the description which will follow, made with reference to the appended drawings, in which:

FIG. 1 gives zeta potential curves obtained for a product of the invention and a product of the prior art;

FIG. 2 gives zeta potential curves obtained for another product of the invention and a product of the prior art.

For the continuation of the description, the expression "colloidal dispersion" or "sol" of inorganic particles denotes any system composed of fine solid particles of colloidal dimensions, that is to say particles having a size generally lying between 1 nm and 500 nm, more particularly 1 nm and 100 nm. The sizes given here are measured by the technique of quazielastic light scattering (QELS) or by the laser diffraction technique. These particles are in stable suspension in a liquid phase. This is understood to mean that, with regard to these dispersions, a cake formed by separation by settling is not observed to form before several days, for example at least 8 days. Furthermore, the cake formed by separating by settling, if it is formed, can be resuspended by simple agitation. The particles can optionally comprise bonded or adsorbed ions, such as, for example, acetates, nitrates, chlorides or ammoniums. It should be noted that, in such dispersions, the particles may occur either completely in the form of colloids or simultaneously in the form of ions or of polyions and in the form of colloids.

In the case of the present invention, the liquid phase is generally an aqueous phase. This can more particularly be water or a water/water-miscible solvent mixture.

Mention may be made, as solvent of this type, of alcohols, such as methanol or ethanol, glycols, such as ethylene glycol, acetate derivatives of glycols, such as ethylene glycol monoacetate, the glycol ethers, polyols or ketones.

Furthermore, and still within the context of the present description, the term "rare earth metal" is understood to mean the elements from the group consisting of yttrium and the elements of the Periodic Table of the Elements with an atomic number of between 57 and 71 inclusive. The term "trivalent rare earth metal" is understood to mean, unless otherwise indicated, a rare earth metal which can exist only in the trivalent form.

Also for the present description, the term "specific surface" is understood to mean the B.E.T. specific surface determined by nitrogen adsorption in accordance with Standard ASTM D 3663-78 drawn up from the Brunauer-Emmett-Teller method described in the periodical "The Journal of the American Chemical Society, 60, 309 (1938)".

Finally, it is specified that, unless otherwise indicated, in the ranges of values which are given, the values at the limits are included.

For the continuation of the description, the characteristics of the colloidal inorganic particles will be described in a first part and the characteristics of the ampholytic copolymer will be described in a second part.

A-Colloidal Inorganic Particles

The colloidal dispersion of the invention comprises inorganic particles having the size which was given above. More particularly, these inorganic particles are based on an inorganic oxide which can be chosen from $CeO_2$, $TiO_2$, $ZrO_2$, $Al_2O_3$ or $Fe_2O_3$. The particles can also be based on a hydroxide and/or on an oxyhydroxide of the same above metal elements. For the continuation of the description in this section A, the term "oxide", in the singular or in the plural, should be understood as applying not only to the oxide form but also to the "hydroxide" and "oxyhydroxide" forms.

The particles can also be based on a mixture of the oxides mentioned above.

Furthermore, the particles can also be based on a mixture of cerium oxide with at least one other element chosen from rare earth metals or tin or also on a mixture of zirconium oxide and of a trivalent rare earth metal, the rare earth metal elements and tin generally being present in the oxide form.

The invention applies not only to the case described above, where the particles are composed of a mixture of oxides, but also to the case where the dispersion comprises particles of a first type of oxide as a mixture with particles of another type of oxide.

Generally, the ampholytic copolymer is present at the surface of the particles. Furthermore, the aim is to cover the greatest possible portion of the surface of the particle with the copolymer so as to improve the stability of the dispersion. For this reason, the amount of copolymer in the dispersion will increase as the specific surface of the particles increases.

More specifically, the amount of copolymer is such that the ratio by weight of the oxide or oxides with respect to the combination of particle and copolymer is at least 40%, preferably at least 50%, more advantageously at least 80% and more preferably at least 90%. According to a specific embodiment, this ratio is at least 95%, more preferably at least 99%.

The dispersions of the invention exhibit an overall content of particles which can vary within wide limits and which can, for example, be at most 45% to 50%, a content expressed as weight of inorganic particle oxide with respect to the whole of the dispersion. The minimum content is not critical and it can preferably be at least 0.1%.

More specific embodiments which relate to specific characteristics of the particles will now be described in more detail.

A-1-First Specific Embodiment

According to a first embodiment, the particles exhibit the characteristics of the particles of the colloidal dispersion described in Patent Application WO 2006/111650. Reference may thus be made to the teaching of this patent application, the main components of which will be restated below.

The colloidal particles are particles of a compound of cerium and of at least one other element M chosen from zirconium, rare earth metals (Ln) other than cerium, titanium and tin and this compound is in the form of a mixed oxide in which the cerium and the element M are in pure solid solution, the compound comprising cerium in the form cerium (III) in an amount, expressed as cerium(III)/total cerium atomic ratio, of between 0.005 and 0.06.

These particles exhibit a size which generally lies between 1 nm and 100 nm, more particularly between 2 nm and 50 nm.

One of the specific characteristics of the particles in the case of this first embodiment is that the compound of which they are composed is in the form of a mixed oxide $(Ce,M)O_2$ in which the cerium and the element M are in solid solution. This is understood to mean that one of the elements, generally the element M, is completely incorporated in the crystal lattice of the oxide of the other matrix-forming element, for example cerium. This incorporation can be demonstrated by the X-ray diffraction technique on colloids after washing, in particular by ultrafiltration or also by ultracentrifuging, and drying at a temperature of 60° C. The X-ray diagrams reveal the presence of a crystalline structure corresponding to the oxide of the matrix-forming element (generally cerium oxide) and having unit cell parameters more or less offset with respect to a pure oxide of this first matrix-forming element, which thus demonstrates the incorporation of the other element in the crystal lattice of the oxide of the first. For example, in the case of a solid solution of the element M in cerium oxide, the X-ray diagrams then reveal a crystalline structure of fluorite type, just like crystalline ceric oxide $CeO_2$, the unit cell parameters of which are more or less offset with respect to a pure ceric oxide, thus reflecting the incorporation of the element M in the crystal lattice of the cerium oxide.

The solid solution is pure, that is to say that, for the colloidal particles, the total amount of one element is in solid solution in the other, for example all the element M in solid solution in the cerium oxide. In this case, the X-ray diagrams show only the presence of the solid solution and do not comprise lines corresponding to an oxide of the type of oxide of the element other than the matrix-forming element, for example an oxide of the element M.

Another characteristic of this first embodiment is the presence of cerium in the form of cerium(III) in the compound of which the colloidal particles are composed. The amount of cerium(III), expressed by the cerium(III)/total cerium atomic ratio, is between 0.005 and 0.06. More particularly, this amount can be between 0.005 and 0.05 and more particularly still between 0.005 and 0.03.

It should be noted here that cerium(III) can be present in the compound as cation, either in the form adsorbed at the surface of the particles of the cerium compound or in the crystal unit cell of the compound. Of course, both these forms may coexist.

The presence of cerium(III) in solution can be demonstrated by chemical quantitative determination. Use may thus be made of a technique for analysis by potentiometric assaying by oxidation of cerium(III) to give cerium(IV) using potassium ferricyanide in potassium carbonate medium. The presence of cerium(III) at the surface of the particles can be demonstrated by the determination of the isoelectric point of the colloidal dispersions. This determination is carried out in a known way by measuring the variation in the zeta potential of the dispersions. When the variation in this potential is measured, by varying the pH of a dispersion from an acidic value to a basic value, this potential changes from a positive value to a negative value, the transition at the zero value of the potential constituting the isoelectric point. The presence of cerium(III) at the surface increases the value of the isoelectric point with respect to a compound comprising only cerium (IV). It should be noted that the measurement method which has just been described applies to a dispersion in the absence of the copolymer, for example to a starting dispersion which will be used to obtain a dispersion according to the invention in the process for the preparation of the dispersion, which process will be described later.

Various alternative forms of this first embodiment, depending on the nature of the cerium compound and more specifically on the nature of the element M, will now be described in more detail. It should be noted here that the formulae which are given below in the description of these alternative forms correspond to compositions which result from chemical analyses on colloids recovered either by ultracentrifuging at 50 000 rev/min for 6 hours or after washing the dispersions, this washing being carried out by ultra-filtration or by dialysis with at least 10 equivalent volumes of water (1 volume of dispersion:10 volumes of water).

According to a first alternative form, the element M is zirconium. More particularly, in the case of this alternative form, the compound can correspond to the formula (1) $Ce_{1-x}Zr_xO_2$ in which x is less than 1 and is at least equal to 0.01, preferably at least equal to 0.02.

According to another alternative form, the element M is a combination of zirconium and of tin. More particularly, in the case of this alternative form, the compound can correspond to the following formula (2) $Ce_{1-x-y}Zr_xSn_yO_2$ in which x+y<1, x adheres to the condition $0.05 \leq x \leq 0.95$ and y is at least equal to 0.01, the high value of y being chosen so that a solid solution is indeed obtained. Preferably, x adheres to the condition $0.20 \leq x \leq 0.8$ and more preferably still the condition $0.40 \leq x \leq 0.60$. Preferably also, y is at least equal to 0.05 and more preferably still y is at least equal to 0.2. Preferably, y is at most equal to 0.4 and more preferably still at most equal to 0.25.

According to a third alternative form, the element M is a combination of zirconium and of at least one rare earth metal Ln, more particularly a trivalent rare earth metal. The rare earth metal can be in particular lanthanum, gadolinium, terbium, praseodymium or neodymium. More particularly, in the case of this third alternative form, the compound can correspond to the formula (3) $Ce_{1-x-y}Zr_xLn_yO_2$ in which x+y<1, x adheres to the condition $0.05 \leq x \leq 0.95$ and y is at least equal to 0.01, the high value of y being chosen so that a solid solution is indeed obtained. Preferably, x adheres to the condition $0.20 \leq x \leq 0.08$ and more preferably still the condition $0.40 \leq x \leq 0.60$. Preferably also, y is at least equal to 0.02 and more preferably still y is at least equal to 0.04. Preferably, y is at most equal to 0.07, in particular at most equal to 0.05 and more preferably still at most equal to 0.03. Still in the case of this alternative form, the element M can be a combination of at least two rare earth metals, at least one of which is praseodymium. Finally, it may be noted that, in the case where M is terbium or praseodymium, optionally in combination with another rare earth metal, these elements can be present both in the Tb(III) and Pr(III) forms and the Tb(IV) and Pr(IV) forms.

According to yet another alternative form, the element M is a combination of zirconium, of tin and of at least one rare earth metal Ln. Here again, the invention applies very particularly well to the case where the rare earth metal is a trivalent rare earth metal, and the rare earth metal can in particular be lanthanum, gadolinium, terbium, praseodymium or neodymium. More particularly in the case of this alternative form, the compound can correspond to the formula (4) $Ce_{1-x-y-z}Zr_xSn_yLn_zO_2$ in which x+y+z<1, x adheres to the condition $0.05 \leq x \leq 0.95$, y is at least equal to 0.01 and z is at least equal to 0.01. Preferably, x adheres to the condition $0.20 \leq x \leq 0.8$ and y is at least equal to 0.10 and more preferably still x adheres to the condition $0.40 \leq x \leq 0.60$ and y is at least equal to 0.2. The high values of y and z are chosen so that a solid solution is indeed obtained. Preferably, y is at most equal to 0.4 and more preferably still at most equal to 0.25; furthermore, preferably, z is at most equal to 0.05 and more preferably still at most equal to 0.03.

The compound of the dispersion of the invention can also be a compound in which M is a rare earth metal or a combination of rare earth metals. Again, the invention applies very particularly well to the case where the rare earth metal is a trivalent rare earth metal. The rare earth metal can in particular be lanthanum, gadolinium, terbium, praseodymium or neodymium. The compound can then correspond more particularly to the following formula (5) $Ce_{1-x}Ln_xO_2$ in which x is at most equal to 0.15 and is at least equal to 0.01, preferably at least equal to 0.02 and more preferably still at least equal to 0.04. Preferably, x is at most equal to 0.10 and more preferably still at most equal to 0.05. The rare earth metal can be present, at least in part, in the Ln(III) form and, here again, either in the crystal unit cell or in the form adsorbed at the surface of the particles of the cerium compound. In the case of praseodymium, the latter element can be present both in the Pr(III) and Pr(IV) forms and, in the same case, x is more particularly at least equal to 0.04 and more particularly still between 0.03 and 0.08.

According to yet another alternative form of the invention, the compound is a mixed oxide of formula (6) $Ce_{1-x}Ti_xO_2$ in which x is at most equal to 0.6 and is at least equal to 0.01, preferably at least equal to 0.05 and more preferably still at least equal to 0.2. Preferably, x is at most equal to 0.5.

The particles which constitute the compound of the dispersion exhibit a fine and narrow particle size distribution. This is because they have a size, measured by their mean diameter, which is preferably at most 10 nm and which can more particularly be between 2 and 8 nm. This size is conventionally determined by transmission electron microscopy (TEM) on a sample dried beforehand on a carbon membrane supported on a copper grid and over a mean of 50 measurements.

In addition, these particles are well separated. The cryo-TEM technique can be used to determine the state of aggregation of the particles. It makes it possible to observe, by transmission electron microscopy, samples kept frozen in their natural medium, which can, for example, be water.

In the case of this embodiment, the liquid phase of the dispersion is more particularly water.

A second specific embodiment will now be described.

A-2-Second Specific Embodiment

According to this form, the inorganic particles of the dispersion are cerium oxide particles, these particles (secondary particles) exhibiting a mean size of at most 200 nm, these secondary particles being composed of primary particles having sizes exhibiting a mean value of at most 100 nm with a standard deviation having a value of at most 30% of the said mean size.

The particles of which the dispersion according to this second embodiment is composed and which exhibit a mean size of at most 200 nm are referred to, in the continuation of the description relating to this second form, as "secondary particles". These particles are aggregates of other finer aggregated particles, subsequently referred to as "primary particles".

According to an advantageous characteristic, these primary particles are fine and monodispersed. Specifically, they exhibit a mean size of at most 100 nm with a standard deviation having a value of at most 30%, more particularly of at most 20%, of the said mean size.

The mean value of the size of the primary particles is determined by the X-ray diffraction (XRD) technique. The value measured by XRD corresponds to the size of the coherent domain calculated from the width of the two most intense diffraction lines using the Scherrer model. This value can also be determined by the measurement of the BET surface.

The standard deviation mentioned here has the usual mathematical meaning; it is the square root of the variants and is expressed by the formula:

$$\sigma = \sqrt{\frac{1}{n}\sum_{i=1}^{n}(x_i - \bar{x})^2}$$

n being the number of particles taken into account in the measurement, $x_i$ being the size of a particle i, $\bar{x}$ being the mean value of the size of the particles $(1/n\Sigma_i x_i)$.

The size of the n different particles is measured from a photograph obtained by transmission electron microscopy (TEM).

This standard deviation can more particularly be at most 15% and more particularly still at most 10% of the value of the mean size.

The primary particles can more particularly have sizes which exhibit a mean value of at most 80 nm, more particularly still of at most 60 nm.

These mean sizes of primary particles can furthermore be at least 10 nm, in particular at least 20 nm and more particularly at least 30 nm. According to specific alternative forms, these mean sizes can thus be between 10 nm and 100 nm, 20 nm and 80 nm, and 30 nm and 60 nm.

As indicated above, these primary particles form aggregates which thus constitute the secondary particles. These secondary particles can more particularly have a mean size of at most 150 nm, more particularly of at most 100 nm.

Furthermore, according to another advantageous characteristic of this embodiment, these secondary particles are themselves also monodispersed. Specifically, they can exhibit a dispersion index of at most 0.5. This index can more particularly be at most 0.4 and more particularly still at most 0.3.

Throughout the description of this embodiment and as regards the secondary particles, the mean size and the dispersion index are the values obtained by employing the laser diffraction technique using a laser particle sizer (distribution by weight).

The term "dispersion index" is understood to mean the ratio:

$$\sigma/m = (d_{90} - d_{10})/2d_{50}$$

in which:

$d_{90}$ is the size or diameter of the particles for which 90% of the particles have a diameter of less than $d_{90}$;

$d_{10}$ is the size or diameter of the particles for which 10% of the particles have a diameter of less than $d_{10}$;

$d_{50}$ is the mean size or diameter of the particles.

The liquid phase of the dispersions according to this second embodiment can be water.

This can also be a water/water-miscible solvent mixture. Mention may be made, as example solvent of this type, of alcohols, such as methanol or ethanol, glycols, such as ethylene glycol, alkyl derivatives or acetates of the glycols, such as ethylene glycol monoacetate, or polyols.

Processes for the preparation of the dispersion according to this second embodiment will now be described.

The dispersion can be prepared by a first process which comprises the following stages:

(a) a solution of a cerium(III) salt which additionally comprises cerium(IV) is prepared;

(b) this solution is brought into contact under an inert atmosphere with a base, whereby a precipitate is obtained;

(c) the medium obtained in the preceding stage is subjected to a heat treatment under an inert atmosphere, at least one of stages (a), (b) or (c) being carried out in the presence of nitrate ions;

(d) the medium thus obtained is successively, but in any order, acidified and washed, whereby the dispersion is obtained.

The first stage (a) of the above process thus consists in preparing a starting solution which is a solution of a cerium (III) salt.

Use may more particularly be made, as cerium(III) salts, of cerium(III) nitrate, chloride, sulphate or carbonate, and also mixtures of these salts, such as nitrate/chloride mixtures.

In a known way, this starting solution must exhibit the appropriate acidity in order for the cerium to be indeed entirely present in solution.

The starting solution additionally comprises cerium(IV). The cerium(IV) is contributed by a salt. This can, for example, be cerium(IV) nitrate.

Generally, the amount of cerium(IV) is such that the (Ce(IV)/Ce(III)) molar ratio in the starting solution is between 1/5000 and 1/50.

The starting solution prepared in stage (a) can be degassed beforehand by bubbling with an inert gas. The term "inert gas" or "inert atmosphere" is understood to mean, for the present description, an atmosphere or a gas devoid of oxygen, it being possible for the gas to be, for example, nitrogen or argon.

The second stage (b) of the process consists in reacting the starting solution with a base.

Use may in particular be made, as base, of products of hydroxide type. Mention may be made of alkali metal or alkaline earth metal hydroxide and aqueous ammonia. Use may also be made of secondary, tertiary or quaternary amines. However, amines and aqueous ammonia may be preferred in so far as they reduce the risks of contamination by alkali metal or alkaline earth metal cations.

The base can also be degassed beforehand by bubbling with an inert gas.

In order to carry out the reaction of the second stage of the process, the operation of bringing into contact can be carried out in any order of introduction of the reactants. However, it is preferable to introduce the starting solution into a medium comprising the base.

This second stage must be carried out under an inert atmosphere, either in a closed reactor or in a semi-closed reactor with flushing by the inert gas. The operation of bringing into contact is generally carried out in a stirred reactor.

Finally, this second stage is generally carried out at ambient temperature (20° C.-25° C.) or at a temperature of at most 50° C.

The third stage (c) of the process is a heat treatment of the reaction medium obtained on conclusion of the preceding stage.

This treatment consists in heating the medium and in maintaining it at a temperature which is generally at most 95° C. and more particularly between 60° C. and 95° C.

The duration of this treatment can be between a few minutes and a few hours.

This treatment is also carried out under an inert atmosphere, that which was described on the subject of this atmosphere for the second stage likewise applying here.

According to one characteristic of the process, at least one of stages (a), (b) or (c) has to be carried out in the presence of nitrate ions. Generally, the nitrate ions are introduced by the addition of nitric acid, more particularly in stage (a), during the preparation of the cerium(III) solution.

The amount of nitrate ions, expressed by the $NO_3^-/Ce^{3+}$ molar ratio, is generally between 1/3 and 5.

The final stage of the process, stage (d), in fact comprises two successive operations which can be carried out in any order. These operations are, first, an acidification and, secondly, a washing operation.

These operations will be described more specifically below, in the case of an acidification then washing operation sequence.

The acidification generally takes place by addition of an acid, after cooling the medium obtained on conclusion of stage (c).

Use may be made of any inorganic or organic acid. Use is more particularly made of nitric acid.

The amount of acid added is such that the pH of the medium after acidification is between 2 and 5.

This operation can be carried out under air; it is no longer necessary to operate under an inert atmosphere at this phase of the process.

Acidification is followed by a washing operation, the purpose of which is to remove soluble entities, essentially salts, from the dispersion.

The washing operation can be carried out in various ways, with or without solid/liquid separation.

It can thus be carried out by separating the solid particles from the liquid phase, for example by frontal filtration, separating by settling or centrifuging. The solid obtained is subsequently redispersed in an aqueous phase. Tangential filtration can also be carried out.

This washing operation can optionally be repeated, if necessary, for example until a given conductivity of the dispersion is obtained, the conductivity measuring the level of impurities present in this dispersion.

As indicated above, the order of the operations can be inverted with respect to that which has just been described. Thus, on conclusion of stage (c) and here again generally after cooling the medium obtained, a washing operation can then be carried out in the way described above. On conclusion of the washing operation, the medium obtained is subsequently acidified.

On conclusion of stage (d), a dispersion according to the second embodiment is obtained.

In the case of a dispersion in a water-miscible solvent medium, this dispersion can be prepared in a way known per se starting from an aqueous dispersion as obtained by the process which has just been described and by bringing it into contact with the solvent.

The operation of bringing into contact can be carried out at ambient temperature, for example approximately 20° C., but also at a higher temperature, for example within a range extending from 60° C. to 150° C.

A second process will now be described.

This second process differs from the first solely in the first stage.

This first stage consists in preparing a solution of a cerium (III) salt which additionally comprises aqueous hydrogen peroxide solution.

That which has been described above with regard to the nature of the cerium(III) salt likewise applies here.

The amount of $H_2O_2$ solution is such that the ($H_2O_2$/Ce (III)) molar ratio in the cerium salt solution is between 1/10000 and 1/100.

The continuation of this second process is as defined above for the first process, that is to say that the solution of the first stage is brought into contact with a base under an inert atmosphere, a heat treatment is carried out under an inert atmosphere and the medium thus obtained is acidified and washed (stages (b), (c) and (d) as described above with presence of nitrate ions in at least one of stages (a) (b) and (c)). That which was described above for the combination of these subsequent stages and for the first process thus likewise applies here for the second process.

The ampholytic copolymer will now be described.

B-Ampholytic Copolymer

The dispersion of the invention is characterized in that it additionally comprises an ampholytic copolymer which plays the role of stabilizer. This copolymer will now be described more specifically. Definitions will be given below.

B-1-Definitions

In the present patent application, the term "unit deriving from a monomer" denotes a unit which can be obtained directly from the said monomer by polymerization. Thus, for example, a unit deriving from an acrylic or methacrylic acid ester does not cover a unit of formula —$CH_2$—CH(COOH)—, or —$CH_2$—C($CH_3$)(COOH)—, for example obtained by polymerizing an acrylic or methacrylic acid ester and then by hydrolysing. Thus, the terminology "unit deriving from a monomer" relates only to the final composition of the polymer and is independent of the polymerization process used to synthesize the polymer.

In the present patent application, the term "hydrophobic", for a monomer, is used in its normal sense of "which does not have an affinity for water"; this means that the monomer can form a two-phase macroscopic solution in distilled water at 25° C., at a concentration of greater than or equal to 1% by weight, or has been categorized as hydrophobic in the present patent application.

In the present patent application, the term "hydrophilic", for a monomer, is also used in its normal sense of "which has an affinity for water", that is to say is not capable of forming a two-phase macroscopic solution in distilled water at 25° C., at a concentration of greater than or equal to 1% by weight, or has been categorized as hydrophilic in the present patent application.

The term "anionic or potentially anionic units" is understood to mean units which comprise an anionic or potentially anionic group and/or which have been categorized as such. Anionic units or groups are units or groups which exhibit at least one negative charge (generally in combination with one or more cations, such as cations of alkali metal or alkaline earth metal compounds, for example sodium, or with one or more cationic compounds, such as ammonium), whatever the pH of the medium in which the copolymer is present. Potentially anionic units or groups are units or groups which can be neutral or can exhibit at least one negative charge, depending on the pH of the medium in which the copolymer is present. In this case, potentially anionic units in their neutral form or the anionic form will be referred to. By extension, anionic or potentially anionic units or monomers can be referred to. Groups regarded as anionic are typically strong acid groups, for example with a pKa of less than or equal to 2. Groups regarded as potentially anionic are typically weak acid groups, for example with a pKa of greater than 2.

The term "cationic units" is understood to mean units which comprise a cationic group and/or which have been categorized as such. Cationic units or groups are units or groups which exhibit at least one positive charge (generally in combination with one or more anions, such as the chloride ion, the bromide ion, a sulphate group or a methyl sulphate group), whatever the pH of the medium into which the copolymer is introduced. By extension, cationic monomers can be referred to.

The term "neutral units" is understood to mean units which do not exhibit a charge, whatever the pH of the medium in which the copolymer is present.

In the present patent application, the ratio by weight between blocks corresponds to the ratio between the weights of the monomers (or mixtures of monomers) used for the preparation of the blocks (taking into account the variations in weights related to a possible subsequent modification). The proportions by weight of the blocks are the proportions with respect to the total block copolymer and correspond to the proportions by weight of the monomers (or the mixtures of monomers) used for the preparation of the blocks, with respect to the whole of the monomers used to prepare the block copolymer (taking into account the variations in weights related to possible subsequent modification).

In the present patent application, the term "transfer agent" is understood to mean an agent capable of inducing controlled radical polymerization in the presence of unsaturated monomers and optionally of a source of free radicals.

In the present patent application, a "composition formed of monomers" employed during a polymerization stage is defined by the nature and the relative amount of monomers. The composition can be a single monomer. It can be a combination of several monomers (comonomers), of different natures, in given proportions. Likewise, "a composition of a macromolecular chain or a composition formed of units of a macromolecular chain" is defined by the nature and the relative amount of the monomers from which the units of the macromolecular chain are derived. The matter may concern a macromolecular chain deriving from a single monomer (homopolymer chain). The matter may concern a macromolecular chain having units derived from several monomers of different natures, in given proportions (copolymer chain).

In the present patent application, a "different composition formed of monomers" denotes a composition for which the nature of the monomer or monomers and/or for which their proportions of different monomers are different. It is the same, by analogy, for a different macromolecular chain or a different composition formed of units. A composition formed of monomers comprising 100% of a monomer $M^1$ is different from a composition comprising 100% of a monomer $M^2$. A composition formed of monomers comprising 50% of a monomer $M^1$ and 50% of a monomer $A^1$ is different from a composition comprising 10% of the monomer $M^1$ and 90% of the monomer $A^1$. A composition formed of monomers comprising 50% of a monomer $M^1$ and 50% of a monomer $A^1$ is different from a composition comprising 50% of the monomer $M^1$ and 50% of the monomer $A^2$.

In the present patent application, for simplicity, units deriving from a monomer are sometimes put into the same category as the monomer itself, and vice versa.

In the present patent application, an "ethylenically unsaturated" monomer is a compound comprising a polymerizable carbon-carbon double bond. It can be a monoethylenically unsaturated monomer, preferably an α-monoethylenically unsaturated monomer, or a polyethylenically unsaturated monomer. In the present patent application, for the compounds other than star copolymers and for processes other than processes for the preparation of star copolymers, an ethylenically unsaturated monomer denotes a monoethylenically unsaturated monomer, preferably an α-monoethylenically unsaturated monomer.

B-2-Description of the Ampholytic Copolymer

The ampholytic copolymer comprises:
at least one macromolecular chain B comprising cationic units $B_C$ deriving from cationic monomers $B_C$, and
a part A bonded to a single end of at least one macromolecular chain B, this part being a polymeric or nonpolymeric group comprising at least one anionic or potentially anionic group.

It is observed that the ampholytic copolymer can comprise several parts B but that it advantageously comprises just one part A. The macromolecular chain B of the ampholytic copolymer can comprise from 1 to 100% by weight of units $B_C$, preferably from 50 to 100%.

According to a third embodiment of the invention, the part A is a nonpolymeric group. In this third embodiment, the part A can in particular be a unit at the chain end (at the end of the macromolecular chain B) comprising an anionic or potentially anionic group. In this embodiment, the ampholytic copolymer can be referred to as an ampholytic "telomer". Telomeric structures are known to a person skilled in the art; some, and methods of preparation, are described in detail below. The copolymer can thus be a telomer with the structure A-B, where A is a chain end unit comprising at least one anionic or potentially anionic group.

According to a fourth embodiment of the invention, which is preferred, the part A is a polymeric group. It can be a macromolecular chain A which is preferably linear (in contrast to a branched and/or star-shaped and/or crosslinked chain) and which comprises anionic or potentially anionic units $A_A$ deriving from anionic or potentially anionic monomers $A_A$. The macromolecular chains A and B can be bonded to one another via a carbon-carbon bond or via another type of bond.

According to a first alternative form of this fourth embodiment, the copolymer exhibits a plurality, preferably at least 3, of macromolecular chains B which are bonded to the single macromolecular chain A, which macromolecular chain A is bonded at branching points which are not situated at the end of the macromolecular chain A. In this first alternative form, the ampholytic copolymer can in particular be a comb copolymer (backbone A)-(side chains B), the part A constituting the backbone A and the copolymer comprising a plurality of macromolecular chains B each bonded to the backbone A at one of their ends.

According to a second alternative form of this fourth embodiment which is particularly preferred, the copolymer exhibits one or two macomolecular chains B which are bonded to the macromolecular chain A at one or both of the ends of the latter. In this second alternative form, the macromolecular chain B can be likened to a "block B" and the macromolecular chain A can be likened to a "block A". Still in this alternative form, the ampholytic copolymer can be referred to as an ampholytic "block copolymer". Preferably, for this alternative form, the macromolecular chains A and B are bonded to one another via a carbon-carbon bond.

The ampholytic copolymer can in particular be chosen from the following copolymers:
(block A)-(block B) diblock copolymer, the part A constituting the block A and the macromolecular chain B constituting the block B,
(block B)-(block A)-(block B) triblock copolymer, the part A constituting the block A and the macromolecular chain B constituting the block B.

According to the second alternative form of the fourth embodiment, the copolymer is a linear diblock or triblock copolymer, the block A and/or the block B of which, preferably both, derives from ethylenically unsaturated monomers, preferably from mono-α-ethylenically unsaturated monomers, and/or from monomers of copolymerizable diallyl type, such as N,N-dimethyldiallylammonium chloride (DADMAC).

The anionic or potentially anionic group can in particular comprise, if appropriate in the acid form, a group chosen from the following groups:
the carboxylate group —$COO^-$
the sulphonate group —$SO_3^-$
the sulphate group —$SO_4^-$
the phosphonate group —$PO_3^{2-}$
the phosphate group —$PO_4^{2-}$.

If the group is in the acid form, it is combined with at least one or more protons. The group can be combined with a counterion (a cation) other than a proton. It can in particular be a cation of an alkali metal or alkaline earth metal, in particular the sodium or potassium ion, or an organic cation, for example an ammonium ion. It is observed that the cationic groups of the part B can constitute all or a portion of the counterions combined with the anionic or potentially anionic group. Mention is made that the anionic or potentially anionic groups are not zwitterionic groups comprising both a cationic group and an anionic or potentially anionic group (they would then have a zero charge overall).

The $B_C$ units are cationic units. They comprise cationic groups. In the present patent application, the cationic groups do not cover potentially cationic groups of weak base type capable of becoming cationic by addition of a proton, such as primary or secondary amines, or even such as amide groups. The cationic groups can in particular be groups of the following types:

quaternary ammonium (of formula —$N^+R_3$ where R, identical or different, is a group other than the hydrogen atom, for example an optionally substituted hydrocarbon group, if appropriate interrupted by heteroatoms, for example a linear or branched $C_1$-$C_{22}$ alkyl group, for example a methyl group), inium (of formula =$N^+R_2$ where R, identical or different, is a group other than the hydrogen atom, one of which, if appropriate, forms part of a ring connected to the double bond, the said ring being, if appropriate, aromatic, it being possible for at least one of the R groups to be, for example, an optionally substituted hydrocarbon group, if appropriate interrupted by heteroatoms, for example a linear or branched $C_1$-$C_{22}$ alkyl group, for example a methyl group).

In the case of the groups of quaternary ammonium type, the group concerned may in particular be a trimethylammonium group.

In the case of the inium groups, the group concerned may in particular be a pyridinium group, preferably an alkylpyridinium group, preferably a methylpyridinium group.

The cationic group can be combined with a counterion (an anion). It can in particular be a chloride, bromide, iodide, nitrate, methyl sulphate or ethyl sulphate ion. It is observed that the anionic or potentially anionic groups of the part A can constitute all or a portion of the counterions combined with the cationic group. Mention is made that the cationic units are not zwitterionic units comprising both a cationic group and an anionic or potentially anionic group (they would then have a zero charge overall). In other words, the R groups mentioned above do not comprise an anionic substituent.

Mention may be made, as examples of monomers $B_C$ from which the units $B_C$ can be derived, of:
trimethylammoniopropyl methacrylate chloride,
trimethylammonioethylacrylamide or -methacrylamide chloride or bromide,
trimethylammoniobutylacrylamide or -methylacrylamide methyl sulphate,
trimethylammoniopropylmethacrylamide methyl sulphate (MAPTA MeS),
(3-methacrylamidopropyl)trimethylammonium chloride (MAPTAC),
(3-acrylamidopropyl)trimethylammonium chloride (APTAC),
methacryloyloxyethyltrimethylammonium chloride or methyl sulphate,
acryloyloxyethyltrimethylammonium salts (ADAMQUAT),
1-ethyl-2-vinylpyridinium or 1-ethyl-4-vinylpyridinium bromide, chloride or methyl sulphate;
N,N-dimethyldiallylammonium chloride (DADMAC);
dimethylaminopropylmethacrylamide, N-(3-chloro-2-hydroxypropyl)trimethylammonium chloride (DIQUAT);
the monomer of formula:

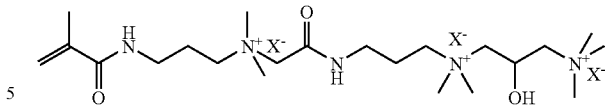

where $X^-$ is an anion, preferably chloride or methyl sulphate,
their mixtures or combinations.

The units $B_C$ can in particular be obtained by polymerization, in order to form at least one macromolecular chain B, of monomers comprising the monomers $B_C$ (if appropriate as a mixture with other monomers). They can also be obtained by polymerization, in order to form at least one precursor macromolecular chain $B_{precursor}$, of monomers comprising precursor monomers of units $B_C$ (if appropriate as a mixture with other monomers), resulting in precursor units of the units $B_C$, followed by chemical modification of the precursor units in order to obtain the units $B_C$ in a macromolecular chain B. Such modifications are known. They can, for example, be quaternizations, for example using dimethyl sulphate or quaternary haloalkylammoniums or quaternary haloalkylhydroxyalkylammoniums.

The macromolecular chain B can comprise units $B_{other}$, other than the units $B_C$, not comprising a cationic group, deriving from monomers $B_{other}$, other than the monomers $B_C$, not comprising a cationic group. They can in particular be:
units $N_{phile}$, which are neutral hydrophilic units deriving from neutral hydrophilic monomers $N_{phile}$,
units $N_{phobe}$, which are neutral hydrophobic units deriving from neutral hydrophobic monomers $N_{phobe}$.

Mention may be made, as examples of monomers $N_{phile}$ from which units $N_{phile}$ can be derived, of:
hydroxyalkyl esters of α,β-ethylenically unsaturated acids, such as hydroxyethyl or hydroxypropyl acrylates and methacrylates, glycerol monomethacrylate, and the like,
α,β-ethylenically unsaturated amides, such as acrylamide, methacrylamide, N,N-dimethylmethacrylamide, N-methylolacrylamide, and the like
α,β-ethylenically unsaturated monomers carrying a water-soluble polyoxyalkylene segment of the polyethylene oxide type, such as polyethylene oxide α-methacrylates (Bisomer S20W, S10W, and the like, from Laporte) or polyethylene oxide α,ω-dimethacrylates, Sipomer BEM from Rhodia (ω-behenyl polyoxyethylene methacrylate), Sipomer SEM-25 from Rhodia (ω-tristyrylphenyl polyoxyethylene methacrylate), and the like,
vinyl alcohol,
α,β-ethylenically unsaturated monomers which are precursors of hydrophilic units or segments, such as vinyl acetate, which, once polymerized, can be hydrolysed to produce vinyl alcohol units or polyvinyl alcohol segments,
vinyllactams, such as vinylpyrrolidones or N-vinylcaprolactam,
α,β-ethylenically unsaturated monomers of ureido type and in particular the methacrylamido of 2-imidazolidinone ethyl (Sipomer WAM II from Rhodia),
nonethylene glycol methyl ether acrylate or nonethylene glycol methyl ether methacrylate,
their mixtures or combinations.

Mention may be made, as examples of monomers $N_{phobe}$ from which $N_{phobe}$ units can be derived, of:

vinylaromatic monomers, such as styrene, α-methylstyrene, vinyltoluene, and the like, vinyl or vinylidene halides, such as vinyl chloride or vinylidene chloride, or vinylaromatic halides, such as pentafluorostyrene, $C_1$-$C_{12}$ alkyl esters of α,β-monoethylenically unsaturated acids, such as methyl acrylate, methyl methacrylate, ethyl acrylate, ethyl methacrylate, butyl acrylate, butyl methacrylate, 2-ethylhexyl acrylate, and the like, vinyl or allyl esters of saturated carboxylic acids, such as vinyl or allyl acetates, propionates, versatates, stearates, and the like, α,β-monoethylenically unsaturated nitriles comprising from 3 to 12 carbon atoms, such as acrylonitrile, methacrylonitrile, and the like, α-olefins, such as ethylene, and the like, conjugated dienes, such as butadiene, isoprene or chloroprene, monomers capable of generating polydimethylsiloxane chains (PDMS). Thus, the part B can be a silicone, for example a polydimethylsiloxane chain or a copolymer comprising dimethylsiloxy units, diethylene glycol ethyl ether acrylate or diethylene glycol ethyl ether methacrylate, their mixtures or combinations.

The macromolecular chain A of the second embodiment comprises anionic or potentially anionic units $A_A$ deriving from monomers $A_A$.

Mention may be made, as examples of monomers $A_A$ from which the units $A_A$ can be derived, of:

monomers having at least one carboxyl functional group, such as α,β-ethylenically unsaturated carboxylic acids or the corresponding anhydrides, such as acrylic acid, acrylic anhydride, methacrylic acid, methacrylic anhydride, maleic acid, maleic anhydride, fumaric acid, itaconic acid, N-methacryloylalanine, N-acryloylglycine, para-carboxystyrene, and their water-soluble salts, monomers which are precursors of carboxylate functional groups, such as tert-butyl acrylate, which produce, after polymerization, carboxyl functional groups by hydrolysis, monomers having at least one sulphate or sulphonate functional group, such as 2-sulphooxyethyl methacrylate, vinylbenzenesulphonic acid, allylsulphonic acid, 2-acrylamido-2-methylpropanesulphonic acid, sulphoethyl acrylate or methacrylate, sulphopropyl acrylate or methacrylate, and their water-soluble salts, monomers having at least one phosphonate or phosphate functional group, such as vinylphosphonic acid, and the like, ethylenically unsaturated phosphate esters, such as phosphates derived from hydroxyethyl methacrylate (Empicryl 6835 from Rhodia) and those derived from polyoxyalkylene methacrylates, and their water-soluble salts, their mixtures or combinations.

Mention is in particular made, as examples of monomers comprising a phosphate or phosphonate functional group, of:

N-methacrylamidomethylphosphonic acid ester derivatives, in particular the n-propyl ester (RN 31857-11-1), the methyl ester (RN 31857-12-2), the ethyl ester (RN 31857-13-3), the n-butyl ester (RN 31857-14-4) or the isopropyl ester (RN 51239-00-0), and their phosphonic monoacid and diacid derivatives, such as N-methacrylamidomethylphosphonic diacid (RN 109421-20-7), N-methacrylamidoethylphosphonic acid ester derivatives, such as N-methacrylamidoethylphosphonic acid dimethyl ester (RN 266356-40-5) or N-methacrylamidoethylphosphonic acid di(2-butyl-3,3-dimethyl) ester (RN 266356-45-0), and their phosphonic monoacid and diacid derivatives, such as N-methacrylamidoethylphosphonic diacid (RN 80730-17-2), N-acrylamidomethylphosphonic acid ester derivatives, such as N-acrylamidomethylphosphonic acid dimethyl ester (RN 24610-95-5), N-acrylamidomethylphosphonic acid diethyl ester (RN 24610-96-6) or bis(2-chloropropyl) N-acrylamidomethylphosphonate (RN 50283-36-8), and their phosphonic monoacid and diacid derivatives, such as N-acrylamidomethylphosphonic acid (RN 151752-38-4), vinylbenzylphosphonic acid dialkyl ester derivatives, in particular the di(n-propyl) (RN 60181-26-2), di(isopropyl) (RN 159358-34-6), diethyl (RN 726-61-4), dimethyl (RN 266356-24-5), di(2-butyl-3,3-dimethyl) (RN 266356-29-0) and di(t-butyl) (RN 159358-33-5) ester derivatives, and their phosphonic monoacid and diacid alternative forms, such as vinylbenzylphosphonic diacid (RN 53459-43-1), diethyl 2-(4-vinylphenyl)ethanephosphonate (RN 61737-88-0), dialkylphosphonoalkyl acrylate and methacrylate derivatives, such as 2-(acryloyloxy)ethylphosphonic acid dimethyl ester (RN 54731-78-1) and 2-(methacryloyloxy) ethylphosphonic acid dimethyl ester (RN 22432-83-3), 2-(methacryloyloxy)methylphosphonic acid diethyl ester (RN 60161-88-8), 2-(methacryloyloxy)methylphosphonic acid dimethyl ester (RN 63411-25-6), 2-(methacryloyloxy)propylphosphonic acid dimethyl ester (RN 252210-28-9), 2-(acryloyloxy)methylphosphonic acid diisopropyl ester (RN 51238-98-3) or 2-(acryloyloxy)ethylphosphonic acid diethyl ester (RN 20903-86-0), and their phosphonic monoacid and diacid alternative forms, such as 2-(methacryloyloxy)ethylphosphonic acid (RN 80730-17-2), 2-(methacryloyloxy)methylphosphonic acid (RN 87243-97-8), 2-(methacryloyloxy)propylphosphonic acid (RN 252210-30-3), 2-(acryloyloxy)propylphosphonic acid (RN 254103-47-4) and 2-(acryloyloxy)ethylphosphonic acid, vinylphosphonic acid, optionally substituted by cyano, phenyl, ester or acetate groups, vinylidenephosphonic acid, in the sodium salt form or the form of its isopropyl ester, or bis(2-chloroethyl) vinylphosphonate, 2-(methacryloyloxy)ethyl phosphate, 2-(acryloyloxy)ethyl phosphate, 2-(methacryloyloxy)propyl phosphate, 2-(acryloyloxy)propyl phosphate, vinylphosphonic acid, 2-(methacryloyloxy)ethylphosphonic acid, 2-(acryloyloxy)ethylphosphonic acid, 2-(methacryloyloxy)ethyl phosphate, and 2-(acryloyloxy)ethyl phosphate.

The units $A_A$ can in particular be obtained by polymerization, in order to form the macromolecular chain A, of monomers comprising the monomers $A_A$ (if appropriate as a mixture with other monomers). They can also be obtained by polymerization, in order to form at least one precursor macromolecular chain $A_{precursor}$, of monomers comprising precursors monomers of units $A_A$ (if appropriate as a mixture with other monomers), resulting in precursor units of the units $A_A$, followed by chemical modification of the precursor units, in order to obtain the units $A_A$ in the macromolecular chain A. Such modifications are known. They can, for example, be hydrolyses of units comprising a hydrolysable ester group (units deriving from ethyl or tert-butyl acrylate or methacrylate, for example).

The macromolecular chain A can comprise units $A_{other}$, other than the units $A_A$, not comprising an anionic or potentially anionic group, deriving from monomers $A_{other}$, other than the monomers $A_A$, not comprising an anionic or potentially anionic group. They can in particular be:
- units $N_{phile}$, which are neutral hydrophilic units deriving from neutral hydrophilic monomers $N_{phile}$ (such units and monomers are described above),
- units $N_{phobe}$, which are neutral hydrophobic units deriving from neutral hydrophobic monomers $N_{phobe}$ (such units and monomers are described above),
- cationic units $A_C$ deriving from cationic monomers $A_C$,
- zwitterionic units Z deriving from zwitterionic monomers Z (such units and monomers are described above),
- potentially cationic units C deriving from potentially cationic monomers (such units and monomers are described above),
- their mixtures or combinations.

The proportion by weight of units $A_{other}$ in the macromolecular chain A can be from 0 to 99%, preferably from 0 to 90%, preferably from 0 to 50%, for example from 0 to 25%. It can advantageously be zero (no units $A_{other}$). The macromolecular chain A preferably comprises from 1 to 100% by weight of units $A_A$, preferably from 50% to 100%.

In the case where a macromolecular chain A comprises units $A_C$, their proportion by number in the said chain is preferably less than that in the macromolecular chain B. Preferably, the proportion by number of units $A_C$ in a macromolecular chain A is less than the proportion by number of units $A_A$. Preferably, the proportion by number of units $A_C$ in a macromolecular chain A is less than 10%, preferably zero.

Mention may be made, as examples of monomers $A_C$ from which units $A_C$ can be derived, of the monomers $B_C$ described in detail above.

Also by way of example, the ampholytic copolymer can be a block copolymer in which the block A derives from acrylic acid and the block B derives from a cationic monomer chosen from DADMAC, MAPTAC and APTAC.

The ampholytic copolymer preferably comprises more, by number, units $B_C$ than anionic or potentially anionic groups. Preferably, it comprises more, by number, units $B_C$ than units $A_A$. Preferably, the ratio by weight of the macromolecular chain(s) B, preferably the block(s) B, to the part A, preferably the macromolecular chain A, preferably the block A, is greater than 1, for example greater than 2.

The ampholytic copolymer can in particular exhibit a theoretical or measured average molecular weight of between 500 and 50000 g/mol. The macromolecular chain(s) B, preferably the block(s) B can in particular exhibit a theoretical or measured average molecular weight of between 500 and 49000 g/mol, preferably between 2000 and 48000 g/mol. The macromolecular chain A, preferably the block A, can in particular exhibit a theoretical or measured average molecular weight of between 250 and 20000 g/mol, preferably between 500 and 10000 g/mol.

The ampholytic copolymer is preferably water-soluble, and preferably water-soluble over the whole of the pH range extending from 5 to 8, preferably from 4 to 9, preferably from 1 to 11. The nature and the proportions of the various units can be chosen to this end. Preferably, it comprises less than 50% by weight of units $N_{phobe}$, preferably less than 25%, preferably less than 10%, for example not at all.

The copolymer can be provided in the solid form or in the form of a solution, for example an aqueous, alcoholic and/or aqueous/alcoholic solution (for example in an ethanol or isopropanol/water mixture). The concentration of the solution can, for example, be from 5 to 75% by weight, typically from 10 to 50% by weight.

Processes for the preparation of the ampholytic copolymers which can be used for the present invention will now be described.

The ampholytic copolymer can be prepared by any appropriate process comprising at least one polymerization stage in order to form the macromolecular chain B or a precursor chain chemically modified during a subsequent stage.

To prepare ampholytic telomers (third abovementioned embodiment), it is possible, for example, to polymerize monomers $B_C$ by radical polymerization in the presence of an agent exhibiting a limiting group which can be grafted by a radical reaction to the propagating chain (for example a thiol group) and at least one carboxyl group. It can, for example, be an agent of formula HOOC—$CH_2$—CH(COOH)—SH.

To prepare a comb copolymer (first alternative form of the fourth abovementioned embodiment), it is possible to proceed via conventional techniques for the grafting of macromolecular chains B to a macromolecular chain A exhibiting functional groups which react with at least one end group of the chains B. Alternatively, it is possible to bring about the growth, by polymerization, preferably by radical polymerization, preferably by controlled radical polymerization, of the side chains B from monomers $B_C$ on a macromolecular chain A prepared beforehand comprising at least three groups, preferably grafted to this end or carried by units copolymerized in the macromolecular chain A to this end, capable of initiating the polymerization. They can in particular be transfer groups capable of inducing a controlled radical polymerization in the presence of unsaturated monomers and optionally of a source of free radicals. Such groups are known in the field of controlled radical polymerization (techniques of ATRP, of polymerization in the presence of nitroxides, of polymerization which are known under the RAFT and/or MADIX names, in the presence of —S—CS— groups, and the like, some being described in detail below). If the preparation is carried out by growth of the chains B on the backbone A using monomers $B_C$, the preparation is preferably carried out at a pH such that the units $A_A$ are in a neutral form, preferably in an acid medium, for example at a pH of less than or equal to 4, preferably 3, for example 2.

In the context of the second alternative form of the fourth embodiment, in particular for preparing block copolymers comprising a block A and at least one block B, it is possible in particular to prepare the copolymer by sequential polymerizations, preferably of controlled radical polymerization type.

Use may in particular be made of a process comprising the following stages:

Stage 1): polymerization, preferably by controlled radical polymerization, of monomers, so as to obtain a first block chosen from block A and block B or a precursor block of the first block, Stage 2): polymerization, preferably by controlled radical polymerization, of monomers, so as to obtain at least one second block chosen from the block A, if a block B or a precursor was obtained in stage 1, and the block B, if a block A or a precursor was obtained in stage 1), or a precursor block of the second block, Stage 3): optional: if precursor blocks were obtained during stages 1) and/or 2), chemical modification of these blocks, so as to obtain the block A and the block B.

Stages 1) and 2) are sequential. The possibility of carrying out other polymerization stages before stage 3) is not ruled out. It is possible to prepare the block B during stage 1), then a block A during stage 2) and optionally another block B during a subsequent stage. However, it is preferable to prepare the block A during stage 1) and then at least one block B during stage 2). In all cases, it is preferable to carry out stage 2) on a block resulting from stage 1) which does not carry a charge. To this end, if the block B is prepared during stage 2), in particular if the preparation is carried out directly using monomers $B_C$ (without subsequent chemical modification), the preparation is preferably carried out at a pH such that the units $A_A$ are in a neutral form, preferably in an acid medium, for example at a pH of less than or equal to 4, preferably 3, for example 2. However, if the block A is prepared during stage 2), then it may be preferable to prepare a precursor of the block B during stage 1) which is nonionic or potentially cationic in the neutral form and then to chemically modify it during a stage 3). If the monomer $B_C$ is of diallylammonium type, it is preferable to polymerize it during stage 2).

Chemical modifications which can be carried out in the context of stage 3) have been described above: they are, for example, quaternizations, in order to obtain the block B, and hydrolysis, in order to obtain the block A. Preferably, stage 3) of chemical modification is not carried out, monomers $B_C$ being directly polymerized during either of stages 1) and 2) and monomers $A_A$ being directly polymerized during the other stage.

The process can in particular comprise a stage of deactivation of transfer groups carried by macromolecular chains and/or of purification of the copolymer and/or of destruction of by-products from chemical modification and/or from deactivation. Such a stage can be carried out after the polymerization stages. It can be carried out before or after stage 3), if the latter is employed. During the optional stage of purification and/or deactivation and/or destruction, the block copolymers obtained or the by-products can be subjected to a reaction for purification from or destruction of certain entities, for example by processes of hydrolysis, oxidation, reduction, pyrolysis, ozonolysis or substitution type. A stage of oxidation with aqueous hydrogen peroxide solution is particularly appropriate for treating sulphur-comprising entities. It is mentioned that some of these reactions or operations can take place in all or part during stage 3). In this case, for these reactions or operations, the two stages are simultaneous.

Preferably, for the polymerization stages (stages 1) and 2) in particular), use is made of "living" or "controlled" radical polymerization methods and particularly preferably of controlled or living radical polymerization methods employing a transfer agent comprising a transfer group of formula —S—CS—, known in particular under the names of RAFT or MADIX.

Reference may in particular be made, as examples of "living" or "controlled" polymerization processes, to:
  the processes of Applications WO 98/58974, WO 00/75207 and WO 01/42312, which employ a radical polymerization controlled by control agents of xanthate type,
  the radical polymerization process controlled by control agents of dithioester or trithiocarbonate type of Application WO 98/01478,
  the radical polymerization process controlled by control agents of dithiocarbamate type of Application WO 99/31144,
  the radical polymerization process controlled by control agents of dithiocarbazate type of Application WO 02/26836,
  the radical polymerization process controlled by control agents of dithiophosphoric ester type of Application WO 02/10223,
  the process of Application WO 99/03894, which employs a polymerization in the presence of nitroxide precursors, or processes employing other nitroxides or nitroxide/alkoxyamine complexes,
  the process of Application WO 96/30421, which uses an atom transfer radical polymerization (ATRP),
  the radical polymerization process controlled by control agents of iniferter type according to the teaching of Otu et al., Makromol. Chem. Rapid. Commun., 3, 127 (1982),
  the radical polymerization process controlled by iodine degenerative transfer according to the teaching of Tatemoto et al., Jap. 50, 127, 991 (1975), Daikin Kogyo Co Ltd Japan, and Matyjaszewski et al., Macromolecules, 28, 2093 (1995),
  the radical polymerization process controlled by tetraphenylethane derivatives disclosed by D. Braun et al. in Macromol. Symp., 111, 63 (1996), or also
  the radical polymerization process controlled by organocobalt complexes described by Wayland et al. in J. Am. Chem. Soc. 116, 7973 (1994),
  the radical polymerization process controlled by diphenylethylene (WO 00/39169 or WO 00/37507).

Stages 1) and 2) can typically be carried out by bringing together monomers, a control agent and optionally at least one source of free radicals. The source of free radicals can be an initiator. Use is preferably made of such an initiator during stage 1). An initiator can again be introduced during stage 2). It is also possible to use free radicals present in the reaction medium resulting from stage 1).

The polymerizations can be carried out in the presence of free radical initiators known to a person skilled in the art. Use may be made, for example, of sodium persulphate. Use may typically be made of amounts of initiators of 5 to 50% by number, with respect to the amount of transfer agent.

The polymerizations are advantageously carried out in solution, preferably in an aqueous, alcoholic or aqueous/alcoholic medium.

Transfer agents of use in the implementation of the process (during stages 1) and 2)) are known to a person skilled in the art and include in particular compounds comprising a transfer group —S—CS—, for the implementation of polymerization processes known under the terms of RAFT and/or MADIX. Use is preferably made of a transfer agent comprising a transfer group of formula —S—CS—O— (xanthate). Such processes and agents are described in detail below.

During the polymerization stages, it is possible to prepare a first block from monomers or a mixture of monomers, initiators and/or agents which promote the control of the polymerization (transfer agents comprising groups of the type —S—CS—, nitroxides, and the like) and then to grow a second block on the first block in order to obtain a diblock copolymer with different compositions formed of monomers from those used for the preparation of the preceding block and optionally with addition of initiators and/or agents which promote the control of the polymerization. These processes for the preparation of block copolymers are known to a person skilled in the art. It is mentioned that the copolymer can exhibit, at the chain end or at the centre of the chains, a transfer group or residue of a transfer group, for example a group comprising an —S—CS— group (for example resulting from a xanthate, from a dithioester, from a dithiocarbamate or from a trithiocarbonate) or a residue of such a group.

It is mentioned that it would not be departing from the scope of the invention to employ and to adapt preparation processes resulting in triblock copolymers, if appropriate subsequently modified (for example during a specific stage or during a stage of destruction and/or deactivation and/or purification) so as to obtain diblock copolymers. In particular, it is possible to envisage employing transfer agents comprising several transfer groups (for example trithiocarbonates Z—S—CS—S—Z), resulting in telechelic copolymers of R-[(block B)-(block A)]$_w$ type, such as triblocks of (core)-[(block A)-(block B)]$_x$ type (for example (block A)-(block B)-R-(block B)-(block A), such as triblocks (block A)-(block B)-(core)-(block B)-(block A)), and then breaking the telechelic copolymers at the core (splitting, "cleaving"), in order to obtain diblock copolymers (block A)-(block B). Splitting can take place during a hydrolysis.

The dispersions of the invention exhibit a positive zeta potential within a pH range of between 1 and 11, more particularly between 3 and 11. In addition, this zeta potential can exhibit a stable value over a large part of this pH range. The term "stable value" is understood to mean a variation in the value of the zeta potential of at most 50% when the pH of a colloidal dispersion, with the ampholytic copolymer of the invention and exhibiting an initial pH of the order of 2 to 3, is varied within the above range.

The dispersions of the invention can be prepared by mixing a starting colloidal dispersion of the type described above in part A of the description with a solution of an ampholytic copolymer also described above in part B of the description. This mixing can be carried out at a temperature of between ambient temperature and 100° C., for example about 80° C. approximately. The mixing is preferably carried out with vigorous stirring.

Mention may be made, as possible uses of the dispersions of the invention, of catalysis, in particular for automobile afterburning. In this case, the dispersions are used in the preparation of catalysts. The dispersions can also be employed for their properties in combating UV radiation, for example in the preparation of films of polymers (of the acrylic or polycarbonate type, for example), of paints, of paper or of cosmetic compositions, in particular in the preparation of creams for protecting from UV radiation.

Examples will now be given.

In these examples, Examples 1 to 8 relate to the preparation of polymers and Examples 9 to 14 relate to colloidal dispersions.

The relative molar masses of the neutral or anionic hydrophilic polymers (e.g.: poly(acrylic acid) and poly(acrylamide) homopolymers) are characterized by steric exclusion chromatography (SEC) using a Shodex OH pak SB-G precolumn, (No. L410061) and three Shodex columns of 30 cm OH pak SB-806M HQ (Nos. L 411 054; L 411 055; L 411 056) and a mobile phase comprising acetonitrile in a solution of deionized water additivated with 0.1 mol/l of NaNO$_3$, the acetonitrile/water ratio by volume being 20/80. The relative molar masses of the copolymers comprising a cationic block are characterized by steric exclusion chromatography (SEC) using a Shodex OH pak SB-G precolumn, (No. L211067) and three Shodex columns of 30 cm OH pak SB-806M HQ (Nos. L 301011; L 301013; L 301014) and a mobile phase comprising acetonitrile in a solution of deionized water additivated with 1 mol/l of NH$_4$NO$_3$ and 100 ppm of DADMAC (so as to passivate the columns), the acetonitrile/water ratio by volume being 20/80. All the measurements of the relative molar masses are made with respect to polyethylene oxide) standards.

In the examples, the water used is deionized water.

EXAMPLE 1

This example relates to the synthesis of poly(acrylic acid) (PAA).

31.87 g of O-ethyl S-(1-(methoxycarbonyl)ethyl) xanthate (CH$_3$CHCO$_2$CH$_3$)S(C=S)OEt, 101.3 g of ethanol, 8.5 g of acrylic acid and 23.64 g of deionized water are introduced at ambient temperature into a 2 l jacketed glass reactor equipped with a mechanical stirrer and a reflux condenser. The temperature of the solution is increased up to 70° C. As soon as this temperature has been reached, 0.49 g of 4,4'-azobis(cyanovaleric acid) is introduced. Starting with the introduction of this initiator, a solution of 76.5 g of acrylic acid in 212.8 g of water is introduced over one hour. At the end of the introduction, 0.49 g of 4,4'-azobis(cyanovaleric acid) is again introduced. The reaction is prolonged for three hours after the end of the introduction.

A sample of polymer is withdrawn. The analysis of the product by high performance liquid chromatography (HPLC) allows it to be concluded that all the acrylic acid has reacted during the polymerization. A steric exclusion chromatography (SEC) analysis with relative calibration with poly(ethylene oxide) provides the following number-average molar mass ($M_n$) and polydispersity index ($M_w/M_n$) values: $M_n$=650 g/mol, $M_w/M_n$=1.60.

EXAMPLE 2

This example relates to the synthesis of a P(acrylic acid-block-diallyldimethylammonium chloride) diblock copolymer: P(AA-DADMAC).

At the end of the synthesis of the first block, as described in Example 1, the temperature is reduced down to 65° C. Once this temperature has stabilized, a solution of 706 g of diallyldimethylammonium chloride (DADMAC) at 65% by weight in water, and also 4 g of V50 initiator sold by Wako (2,2'-azobis(2-methylpropionamidine) dihydrochloride), are introduced. The reaction is subsequently maintained at this temperature for twelve hours. After reacting for 4 hours and 8 hours, 4 g of V50 initiator are added on each occasion to the reaction medium. At the end of the reaction, a sample is withdrawn. A $^1$H NMR analysis gives a DADMAC conversion of 98.2%. $M_n$ and $M_w/M_n$ are measured by SEC in water with a poly(ethylene oxide) calibration curve: $M_n$=2500; $M_w/M_n$=1.50. The superimposition of the two chromatograms of the products from Example 1 and from Example 2 allows it to be concluded that the copolymer formed is diblock in nature. This is because the SEC chromatogram of the product from Example 1 is completely shifted towards the range of the higher molecular weights at the end of the synthesis of the product from Example 2.

EXAMPLE 3

This example relates to the synthesis of poly(acrylic acid) (PAA).

6.2 g of O-ethyl S-(1-(methoxycarbonyl)ethyl) xanthate (CH$_3$CHCO$_2$CH$_3$)S(C=S)OEt, 23.7 g of ethanol, 30 g of acrylic acid and 74.9 g of deionized water are introduced at ambient temperature into a 250 ml jacketed glass reactor equipped with a magnetic stirrer and a reflux condenser, and subjected to a stream of nitrogen for 5 min. The temperature of the solution is increased up to 70° C. As soon as this temperature has been reached, 0.167 g of 4,4'-azobis(cyanovaleric acid) is introduced. After refluxing for three hours, 0.167 g of 4,4'-azobis(cyanovaleric acid) is again introduced. The reaction is prolonged for a further four hours with magnetic stirring.

A sample of polymer is withdrawn. The analysis of the product by high performance liquid chromatography (HPLC) allows it to be concluded that all the acrylic acid has reacted during the polymerization. A steric exclusion chromatography (SEC) analysis with relative poly(ethylene oxide) calibration provides the following number-average molar mass ($M_n$) and polydispersity index ($M_w/M_n$) values: $M_n$=960 g/mol, $M_w/M_n$=1.70.

EXAMPLE 4

This example relates to the synthesis of a P(acrylic acid-block-(3-acrylamidopropyl)trimethylammonium chloride) diblock copolymer: P(AA-APTAC).

At the end of the synthesis of the first block, as described in Example 3, the temperature is reduced down to 65° C. Once this temperature has stabilized, a solution of 15.7 g of (3-acrylamidopropyl)trimethylammonium chloride (APTAC) at 75% by weight in water, 0.073 g of V50 initiator (2,2'-azobis (2-methylpropionamidine) dihydrochloride) and 10 g of deionized water, degassed beforehand with a stream of nitrogen (5 min), are introduced into the solution of the first block. The reaction is subsequently maintained at this temperature (65° C.) for 9 h 30 with magnetic stirring. After reacting for 4 hours, a further 0.073 g of V50 initiator is added to the reaction medium. At the end of the reaction, a sample is withdrawn. A $^1$H NMR analysis gives an APTAC conversion of 99%. $M_n$ and $M_w/M_n$ are measured by SEC, after calibrating with poly(ethylene oxide), giving: $M_n$=2740 g/mol; $M_w/M_n$=1.50. The superimposition of the two chromatograms of the products from Example 3 and from Example 4 allows it to be concluded that the copolymer formed is of diblock nature. This is because the SEC chromatogram of the product from Example 3 is completely shifted towards the range of the higher molecular weights at the end of the synthesis of the product from Example 4.

EXAMPLE 5

This example relates to the synthesis of poly(acrylamide) (PAM).

12.6 g of O-ethyl S-(1-(methoxycarbonyl)ethyl) xanthate ($CH_3CHCO_2CH_3$)S(C=S)OEt, 39.8 g of ethanol, 60.0 g of a 50% acrylamide solution and 46.2 g of deionized water are introduced at ambient temperature into a 250 ml jacketed glass reactor equipped with a magnetic stirrer and a reflux condenser, and subjected to a stream of nitrogen for 5 min. The temperature of the solution is increased up to 70° C. As soon as this temperature has been reached, 0.169 g of 4,4'-azobis(cyanovaleric acid) is introduced. After refluxing for three hours, 0.169 g of 4,4'-azobis(cyanovaleric acid) is again introduced. The reaction is prolonged for an additional four hours with magnetic stirring.

A sample of polymer is withdrawn. The analysis of the product by high performance liquid chromatography (HPLC) allows it to be concluded that all the acrylamide has reacted during the polymerization. A steric exclusion chromatography (SEC) analysis with relative polyethylene oxide) calibration provides the following number-average molar mass ($M_n$) and polydispersity index ($M_w/M_n$) values: $M_n$=530 g/mol, $M_w/M_n$=2.45.

EXAMPLE 6

This example relates to the synthesis of a P(acrylamide-block-(3-acrylamidopropyl)trimethylammonium chloride) diblock copolymer: P(AM-APTAC).

At the end of the synthesis of the first block, as described in Example 5, the temperature is reduced down to 65° C. Once this temperature has stabilized, a solution of 31.4 g of (3-acrylamidopropyl)trimethylammonium chloride (APTAC) at 75% by weight in water, 0.034 g of V50 initiator (2,2'-azobis (2-methylpropionamidine) dihydrochloride) and 20 g of deionized water, degassed beforehand with a stream of nitrogen (5 min), are introduced into the solution of the first block. The reaction is subsequently maintained at this temperature (65° C.) for 9 h 30 with magnetic stirring. After reacting for 4 hours, a further 0.034 g of V50 initiator is added to the reaction medium. At the end of the reaction, a sample is withdrawn. A $^1$H NMR analysis gives an APTAC conversion of 99%. $M_n$ and $M_w/M_n$ are measured by SEC, after calibrating with poly(ethylene oxide), giving: $M_n$=3000 g/mol; $M_w/M_n$=1.50. The superimposition of the two chromatograms of the products from Examples 5 and 6 allows it to be concluded that the copolymer formed is of diblock nature. This is because the SEC chromatogram of the product from Example 5 is completely shifted towards the range of the higher molecular weights at the end of the synthesis of the product from Example 6.

EXAMPLE 7

This example relates to the synthesis of poly(acrylamide) (PAM).

4.22 g of O-ethyl S-(1-(methoxycarbonyl)ethyl) xanthate ($CH_3CHCO_2CH_3$)S(C=S)OEt, 25.0 g of ethanol, 60.0 g of a 50% acrylamide solution and 40.1 g of deionized water are introduced at ambient temperature into a 250 ml jacketed glass reactor equipped with a magnetic stirrer and a reflux condenser, and subjected to a stream of nitrogen for 5 min. The temperature of the solution is increased up to 70° C. As soon as this temperature has been reached, 0.167 g of 4,4'-azobis(cyanovaleric acid) is introduced. After refluxing for three hours, 0.167 g of 4,4'-azobis(cyanovaleric acid) is again introduced. The reaction is prolonged for an additional four hours with magnetic stirring.

A sample of polymer is withdrawn. The analysis of the product by high performance liquid chromatography (HPLC) allows it to be concluded that all the acrylamide has reacted during the polymerization. A steric exclusion chromatography (SEC) analysis with relative poly(ethylene oxide) calibration provides the following number-average molar mass ($M_n$) and polydispersity index ($M_w/M_n$) values: $M_n$=710 g/mol, $M_w/M_n$=2.25.

EXAMPLE 8

This example relates to the synthesis of a P(acrylamide-block-(3-acrylamidopropyl)trimethylammonium chloride) diblock copolymer: P(AM-APTAC).

At the end of the synthesis of the first block, as described in Example 7, the temperature is reduced down to 65° C. Once this temperature has stabilized, a solution of 30.9 g of (3-acrylamidopropyl)trimethylammonium chloride (APTAC) at 75% by weight in water, 0.011 g of V50 initiator (2,2'-azobis (2-methylpropionamidine)dihydrochloride) and 20 g of demineralized water, degassed beforehand with a stream of nitrogen (5 min), are introduced into the solution of the first block. The reaction is subsequently maintained at this temperature (65° C.) for 9 h 30 with magnetic stirring. After reacting for 4 hours, a further 0.011 g of V50 initiator is added to the reaction medium. At the end of the reaction, a sample is withdrawn. A $^1$H NMR analysis gives an APTAC conversion of 99%. $M_n$ and $M_w/M_n$ are measured by SEC, after calibrating with poly(ethylene oxide), giving: $M_n$=3180 g/mol; $M_w/M_n$=1.44. The superimposition of the two chromatograms of the products from Examples 7 and 8 allows it to be concluded that the copolymer formed is of diblock nature. This is because the SEC chromatogram of the product from Example 7 is completely shifted towards the range of the higher molecular weights at the end of the synthesis of the product from Example 8.

EXAMPLE 9

This example relates to the synthesis of a colloidal dispersion of cerium oxide.

A dilute cerium nitrate solution is prepared by addition of 6.4 kg of a 2.88M trivalent cerium nitrate solution (d=1.715), of 1.0 kg of a 68% $HNO_3$ solution, of 4.8 kg of deionized water and of 10.64 g of 1.39M tetravalent cerium nitrate (d=1.440). This solution, with a $Ce^{4+}/Ce_{total}$ molar ratio of 1/1500, is charged to a semiclosed tank and then degassed with vigorous stirring and while bubbling nitrogen through.

A dilute aqueous ammonia solution is prepared by addition of 22.6 kg of deionized water and of 4.6 kg of a 28% aqueous ammonia solution. This solution is charged to a 40 l semiclosed jacketed reactor and then stirred while bubbling nitrogen through.

The dilute cerium nitrate solution is subsequently added to the dilute aqueous ammonia solution at ambient temperature over 30 min while stirring and while flushing with nitrogen. The reaction mixture is subsequently raised in temperature to 80° C. over ¾ of an hour and then maintained at this temperature for 4 h, still while flushing with nitrogen.

On conclusion of this heat treatment, the reaction mixture is allowed to cool and then it is filtered and washed on a Nutsche filter. The cake is resuspended in deionized water and acidified by addition of 68% nitric acid, which results in a dispersion comprising 17.9% by weight of $CeO_2$ and with a pH of 3.0.

The size of the secondary particles is measured using a laser particle sizer of Horiba LA910 type, taking a value for the optical index of $CeO_2$ in water of 1.7. The median size $d_{50}$ is 109 nm. The dispersion index σ/m, calculated from the $d_{10}$, $d_{50}$ and $d_{90}$ values of 89, 109 and 133 nm respectively, is 0.20.

The suspension is observed by TEM. It is found that the primary particles are indeed monodisperse and with a size centred around 60 nm. Each of the particles on a photograph of several hundred particles representative of the suspension is counted and measured, whereby a mean size of 62 nm with a standard deviation of 6 nm is obtained, which standard deviation represents 10% of the size of the mean value.

A portion of the dispersion is dried in an oven at 200° C., which makes it possible to obtain a $CeO_2$ powder for XRD analysis. The X-ray diffractogram for this powder has the signature of crystalline $CeO_2$ (ASTM card 34-394). The mean size of the coherent domain, calculated by application of the Scherrer model from the mid-height width of the diffraction peaks situated at 2θ=28.6°, 47.5° and 56.4°, gives 82 nm. The BET specific surface, determined by nitrogen adsorption, is 13.5 m²/g, which gives a mean size of the primary particles of 62 nm.

EXAMPLE 10

According to the Invention

This example relates to the synthesis of a colloidal dispersion of cerium oxide according to the invention which is stable and cationic over the entire pH range between 1 and 11.

Preparation of the Dispersion 80 g of a PAA-PDADMAC 0.5K-3K solution comprising 0.025% by weight of PAA-PDADMAC are prepared by diluting, with deionized water, the PAA-PDADMAC 0.5K-3K solution described in Example 2.

80 g of a 5% by weight colloidal $CeO_2$ dispersion are prepared by diluting, with deionized water, the colloidal $CeO_2$ dispersion described in Example 9.

The 5% by weight colloidal $CeO_2$ dispersion is added, at ambient temperature and with vigorous stirring, to the 0.025% by weight PAA-PDADMAC 0.5K-3K solution over 10 min. At the end of this addition, the $CeO_2$ concentration is 2.5% by weight. The PAA-PDADMAC/$CeO_2$ ratio by weight is 0.5% by weight.

The size of the secondary particles is measured using a laser particle sizer of Horiba LA910 type, taking a value for the optical index of $CeO_2$ in water of 1.7. The median size $d_{50}$ is 105 nm and the dispersion index σ/m, calculated from the $d_{10}$, $d_{50}$ and $d_{90}$ values of 89, 105 and 131 nm respectively, is 0.20.

An aliquot of this acidic colloidal dispersion is treated, with vigorous stirring, with a few drops of a 28% aqueous ammonia solution, so as to raise the pH to 10.6. No separation by settling is observed. The size of the secondary particles is measured using a laser particle sizer of Horiba LA910 type, taking a value for the optical index of $CeO_2$ in water of 1.7. The median size $d_{50}$ is 106 nm and the dispersion index σ/m, calculated from the $d_{10}$, $d_{50}$ and $d_{50}$ values of 88, 106 and 130 nm respectively, is 0.20.

Measurement of the Zeta Potential

A dilute $KNO_3$ solution is prepared by diluting 1.0110 g of $KNO_3$ (M=101.103 g/mol), made up to 100 g with deionized water. 10 g of the dilute $KNO_3$ solution and 86 g of deionized water are added to an aliquot of 4 g of the acidic colloidal dispersion of $CeO_2$ stabilized with PAA-PDADMAC, which results in a colloidal dispersion of $CeO_2$ stabilized with PAA-PDADMAC comprising 0.1% by weight of $CeO_2$ and $10^{-2}$ mol/l of $KNO_3$. The PAA-PDADMAC/$CeO_2$ ratio remains unchanged and equal to 0.5% by weight. The pH is 3.3 and the ionic conductivity is 1.7 mS/cm. The zeta potential is measured using a device of Malvern ZetaSizer Nano-ZS type. The curve of zeta potential is obtained by gradually increasing the pH up to pH=11 by addition of a $10^{-2}$ mol/l KOH solution. The same curve is drawn up with the colloidal $CeO_2$ dispersion described in Example 9.

FIG. 1 gives the curves of zeta potential thus obtained. The solid curve is that corresponding to the product from Example 10 and it shows that the zeta potential is positive over the entire pH range between pH=1 and pH=11. The curve given in dashes corresponds to that of the product from Example 9.

EXAMPLES 11 TO 14

Examples 11 and 12 relate to the synthesis of colloidal dispersions of cerium oxide according to the invention which are stable and cationic over the entire pH range between 1 and 11. Examples 13 and 14 are comparative examples which relate to colloidal dispersions of cerium oxide comprising a copolymer, no block of which comprises an anionic group.

Preparation of the Dispersions

Solution A: 100 ml of a 20 g/l colloidal $CeO_2$ dispersion are prepared by diluting, with deionized water, a perfectly transparent colloidal $CeO_2$ dispersion, the size of the secondary particles of which, measured by quasielastic light scattering (QELS), is 8 nm and the size of the primary particles of which is 3 nm. The pH is 1.4 and the ionic conductivity is 10 mS/cm.

Solution B: 100 ml of a solution of polymer at the concentration of 20 g/l are prepared in a beaker at ambient temperature and are stirred until a clear and transparent solution is obtained.

Solution B is added over 15 min to solution A, which is kept vigorously stirred and at ambient temperature. On conclusion of this addition, the final CeO₂ concentration is 10 g/l. The acidic colloidal CeO₂ dispersion, thus stabilized by the polymer, retains its initial properties, namely a perfect transparency and a perfect stability over time.

An aliquot of this acidic colloidal dispersion is treated, with vigorous stirring, with a few drops of a 28% aqueous ammonia solution, so as to raise the pH to 10.5. The size of the secondary particles of the basic colloidal dispersion of polymer-stabilized CeO₂ thus obtained, measured by QELS, is presented in Table 1 below. It is observed that the colloidal CeO₂ dispersions of Examples 11 and 12, stabilized with the polymers described in Examples 2 and 4, result in transparent solutions which are stable over time, the sizes of the particles of which, measured by QELS, are comparable with those measured before the beginning of the addition of the aqueous ammonia. In contrast, the colloidal CeO₂ dispersions of Examples 13 and 14, stabilized with the polymers described in Examples 6 and 8, result in unstable dispersions which flocculate.

TABLE 1

| Example | Polymer | Polymer concentration (g/l) | Polymer/CeO₂ ratio by weight | pH | QELS |
|---|---|---|---|---|---|
| 11 | P(AA-DADMAC) 0.5 K-3 K (Example 2) | 20 | 1 | 2.3 | 24 |
|  |  |  |  | 5.3 | 25 |
|  |  |  |  | 6.7 | 24 |
|  |  |  |  | 7.8 | 22 |
|  |  |  |  | 8.5 | 23 |
|  |  |  |  | 9.5 | 22 |
|  |  |  |  | 10.6 | 22 |
| 12 | P(AA-APTAC) 1 K-3 K (Example 4) | 20 | 1 | 2.0 | 17 |
|  |  |  |  | 5.3 | 17 |
|  |  |  |  | 7.1 | 18 |
|  |  |  |  | 8.2 | 18 |
|  |  |  |  | 9.0 | 17 |
|  |  |  |  | 10.4 | 18 |
| 13 | P(AM-APTAC) 0.5 K-3 K (Example 6) | 20 | 1 | 3.4 | Flocculation |
|  |  |  |  | 5.4 | Flocculation |
|  |  |  |  | 7.3 | Flocculation |
|  |  |  |  | 9.5 | Flocculation |
|  |  |  |  | 10.6 | Flocculation |
| 14 | P(AM-APTAC) 1.5 K-9 K (Example 8) | 20 | 1 | 3.3 | Flocculation |
|  |  |  |  | 5.5 | Flocculation |
|  |  |  |  | 6.6 | 121 |

Measurement of the Zeta Potential

A dilute $KNO_3$ solution is prepared by diluting 1.0110 g of $KNO_3$ (M=101.103 g/mol), made up to 100 g with deionized water. 10 g of the dilute $KNO_3$ solution and 86 g of deionized water are added to an aliquot of 4 g of the acidic colloidal dispersion of CeO₂ stabilized with PAA-PDADMAC (polymer resulting from Example 2 with the addition of CeO₂ according to Example 11), which results in a colloidal dispersion of CeO₂ stabilized with PAA-PDADMAC comprising 0.1% by weight of CeO₂ and $10^{-2}$ mol/l of $KNO_3$. The PAA-PDADMAC/CeO₂ ratio by weight is equal to 1. The pH is 3.3 and the ionic conductivity is 1.7 mS/cm. The zeta potential is measured using a device of Malvern ZetaSizer Nano-ZS type. The curve of zeta potential is obtained by gradually increasing the pH up to pH=11 by addition of a $10^{-2}$ mol/l KOH solution.

FIG. 2 gives the curves of zeta potential thus obtained. The solid curve is that corresponding to the product from Example 11 and it shows that the zeta potential is positive over the entire pH range between pH=1 and pH=10.7. The curve given in dashes corresponds to that of the colloidal CeO₂ dispersion of solution A, thus without addition of polymer.

The invention claimed is:

1. A colloidal dispersion of inorganic particles based on an oxide, on a hydroxide and/or an oxyhydroxide of cerium, in a liquid phase, wherein the inorganic particles have a size lying between 1 nm and 100 nm, and wherein the dispersion comprises an ampholytic copolymer comprising at least one macromolecular chain B and a moiety A bonded at a single end of said at least one macromolecular chain B, in which:
   the macromolecular chain B comprises cationic structural units $B_c$ deriving from cationic monomers $B_c$, and
   the moiety A is a polymeric or nonpolymeric group comprising at least one anionic or potentially anionic functional group.

2. The colloidal dispersion as defined by claim 1, exhibiting a positive zeta potential with a pH range of from 1 to 11.

3. The colloidal dispersion as defined by claim 1, wherein the inorganic particles are cerium oxide particles, these particles (secondary particles) exhibiting a mean size of at most 200 nm, these secondary particles comprising primary particles having sizes exhibiting a mean value of at most 100 nm with a standard deviation having a value of at most 30% of the said mean size.

4. The colloidal dispersion as defined by claim 3, wherein the primary particles have sizes which exhibit a standard deviation having a value of at most 20% of said mean size.

5. The colloidal dispersion as defined by claim 3, wherein the primary particles have sizes which exhibit a mean value of at most 80 nm.

6. The colloidal dispersion as defined by claim 3, wherein the secondary particles exhibit a dispersion index of at most 0.5.

7. The colloidal dispersion as defined by claim 3, wherein the secondary particles exhibit a mean size of at most 150 nm.

8. The colloidal dispersion as defined by claim 1, wherein the moiety A of the ampholytic copolymer is selected from the group consisting of:
   a macromolecular chain A comprising anionic or potentially anionic structural units $A_A$ deriving from anionic or potentially anionic monomers $A_A$, and
   a chain end unit comprising at least one anionic or potentially anionic functional group.

9. The colloidal dispersion as defined by claim 1, wherein the cationic units $B_c$ of the macromolecular chain B comprise a quaternary ammonium group.

10. The colloidal dispersion as defined by claim 1, wherein the anionic or potentially anionic functional group comprises, optionally in the acid form, a group selected from the group consisting of:
   the carboxylate group —COO⁻
   the sulfonate group —$SO_3^-$
   the sulfate group —$SO_4^-$
   the phosphonate group —$PO_3^{2-}$, and
   the phosphate group —$PO_4^{2-}$.

11. The colloidal dispersion as defined by claim 1, wherein the ampholytic copolymer comprises a telomer with the structure A-B, where A is a chain end unit comprising at least one anionic or potentially anionic functional group.

12. The colloidal dispersion as defined by claim 1, wherein moiety A of the ampholytic copolymer comprises a macromolecular chain A including anionic or potentially anionic $A_A$ units deriving from anionic or potentially anionic monomers $A_A$ and the ampholytic copolymer is selected from the group consisting of:
   (block A)-(block B) diblock copolymer, the moiety A constituting the block A and the macromolecular chain B constituting the block B, (block B)-(block A)-(block B) triblock copolymer, the moiety A constituting the block A and the macromolecular chain B constituting the block B, and (backbone A)-(side chains B) comb copolymer, the moiety A constituting the backbone A and the copolymer comprising a plurality of macromolecular chains B each bonded to the backbone A at one of the ends thereof.

13. The colloidal dispersion as defined by claim 12, wherein the ampholytic copolymer comprises a linear copolymer diblock or triblock, the block A and/or the block B of which derive from ethylenically unsaturated monomers.

14. The colloidal dispersion as defined by claim 1, wherein the units $B_C$ are cationic units selected from among units deriving from the group of cationic monomers consisting of:
trimethylammoniopropyl methacrylate chloride,
trimethylammonioethylacrylamide or methacrylamide chloride or bromide,
trimethylammoniobutylacrylamide or methacrylamide methyl sulfate,
trimethylammoniopropylmethacrylamide methyl sulfate (MAPTA MeS),
(3-methacrylamidopropyl)trimethylammonium chloride (MAPTAC),
(3-acrylamidopropyl)trimethylammonium chloride (APTAC)
methacryloyloxyethyltrimethylammonium chloride or methyl sulfate,
acryloyloxyethyltrimethylammonium salts (ADAMQUAT),
1-ethyl-2-vinylpyridinium or 1-ethyl-4-vinylpyridinium bromide, chloride or methyl sulfate,
N,N-dimethyldiallylammonium chloride ((DADMAC),
dimethylaminopropylmethacrylamide, N-(3-chloro-2-hydroxypropyl)trimethylammonium (DIQUAT), and
the monomer of the formula:

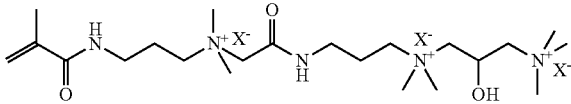

wherein $X^-$ is an anion.

15. The colloidal dispersion as defined by claim 1, wherein the moiety A of the ampholytic copolymer comprises a macromolecular chain A comprising anionic or potentially anionic units $A_A$ deriving from anionic or potentially anionic monomers $A_A$ and the units $A_A$ are anionic or potentially anionic units selected from the units deriving from the group of anionic or potentially anionic monomers $A_A$ consisting of:
acrylic acid, acrylic anhydride, methacrylic acid, methacrylic anhydride, maleic acid, maleic anhydride, fumaric acid, itaconic acid, N-methacryloylalanine, N-acryloylglycine and the water-soluble salts thereof,
2-sulfooxyethyl methacrylate, vinylbenzenesulfonic acid, allylsulphonic acid, 2-acrylamido-2-methylpropanesulphonic acid, sulphoethyl acrylate or methacrylate, sulphopropyl acrylate or methacrylate, and the water-soluble salts thereof, and
vinylphosphonic acid, or ethylenically unsaturated phosphate esters.

16. The colloidal dispersion as defined by claim 1, wherein the macromolecular chain B of the ampholytic copolymer comprises units $B_{other}$ other than the units $B_C$, deriving from at least one monomer $B_{other}$ selected from among neutral hydrophilic or hydrophobic units $B_N$ deriving from a neutral hydrophilic or hydrophobic monomer $B_N$.

17. The colloidal dispersion as defined by claim 16, wherein the monomer chain B of the ampholytic copolymer comprises from 50% to 100%, by weight of units $B_C$.

18. The colloidal dispersion as defined by claim 1, wherein the moiety A of the ampholytic copolymer comprises a macromolecular chain A comprising anionic or potentially anionic units $A_A$ deriving from anionic or potentially anionic monomers $A_A$ and the macromolecular chain A comprises units $A_{other}$ other than the units $A_A$, deriving from at least one monomer $A_{other}$ selected from among neutral hydrophilic or hydrophobic units $A_N$ deriving from a neutral hydrophilic or hydrophobic monomer $A_N$.

19. The colloidal dispersion as defined by claim 18, wherein the macromolecular chain A of the ampholytic copolymer comprises from 50% to 100% by weight of units $A_A$.

20. A process for the formulation of a colloidal dispersion as defined by claim 1, comprising admixing a colloidal dispersion of said the inorganic particles with a solution comprising the ampholytic copolymer.

* * * * *